Figure 1:
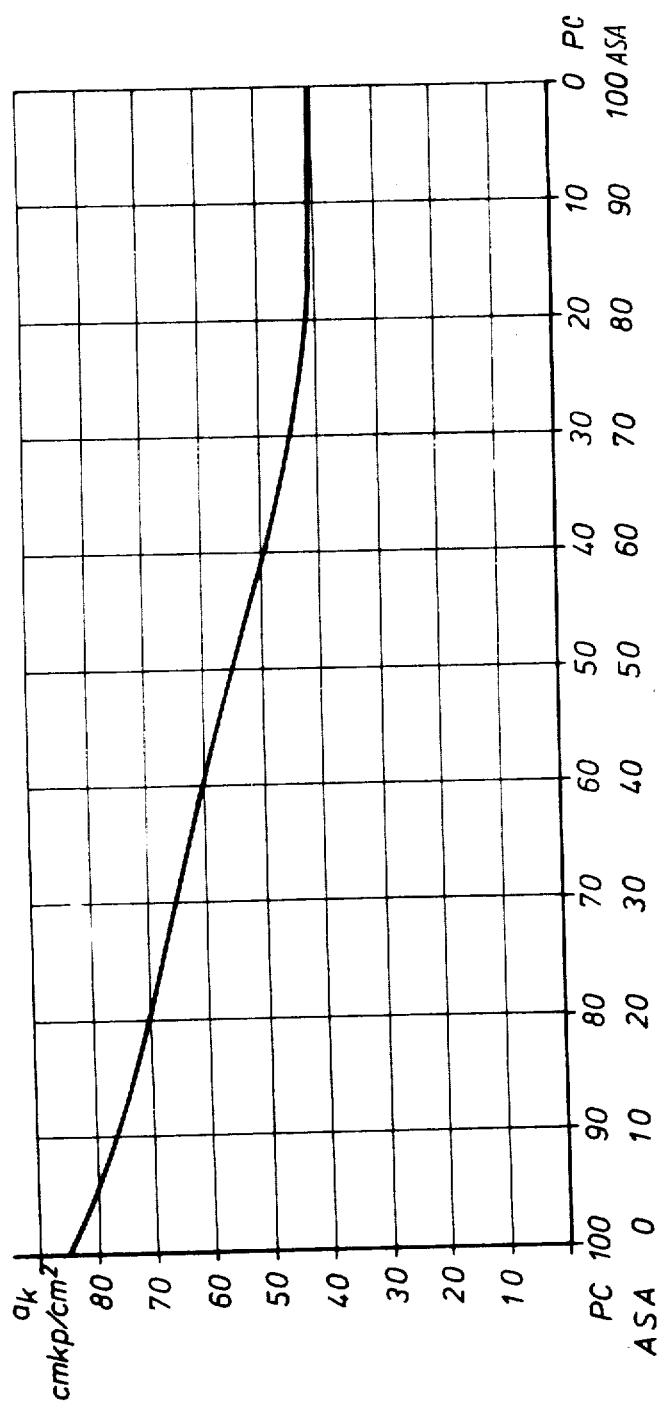

United States Patent
Schirmer et al.

[11] 3,891,719
[45] June 24, 1975

[54] THERMOPLASTIC MOULDING COMPOSITIONS OF A POLYCARBONATE AND A GRAFT COPOLYMER OF STYRENE AND ACRYLONITRILE ON AN ACRYLIC ACID ESTER POLYMER

[75] Inventors: Hermann Schirmer, Krefeld; Gunter Peilstocker, Krefeld-Bockum; Herbert Schuster, Cologne, all of Germany

[73] Assignee: Bayer Aktiengesellschaft, Germany

[22] Filed: Dec. 3, 1973

[21] Appl. No.: 421,645

[30] Foreign Application Priority Data
Dec. 6, 1972 Germany............................ 2259564
Oct. 25, 1973 Germany............................ 2353429

[52] U.S. Cl. ............................................... 260/873
[51] Int. Cl............................................ C08g 39/10
[58] Field of Search....... 260/873, 47 XA, 876, 881, 260/885

[56] References Cited
UNITED STATES PATENTS
3,130,177 4/1964 Grabowski...................... 260/873 X
3,793,405 2/1974 Munzer........................... 260/873 X

*Primary Examiner*—Morris Liebman
*Assistant Examiner*—T. Pertilla
*Attorney, Agent, or Firm*—Connolly and Hutz

[57] ABSTRACT

Thermoplastic moulding compositions and mouldings of:

a. from 95 to 5% by weight of polycarbonates of dihydric phenols, and b. from 5 to 95% by weight of a graft copolymer of styrene and acrylonitrile on an acrylic acid ester homopolymer and/or copolymer.

8 Claims, 4 Drawing Figures

THERMOPLASTIC MOULDING COMPOSITIONS OF A POLYCARBONATE AND A GRAFT COPOLYMER OF STYRENE AND ACRYLONITRILE ON AN ACRYLIC ACID ESTER POLYMER

This invention relates to thermoplastic moulding compositions comprising a mixture of dihydric phenol polycarbonate and polymerisation products of acrylic acid esters, styrene and acrylonitrile.

It is known that the properties, including thermoplasticity, of polycarbonates of aromatic dihydroxy compounds can be modified, e.g. by adding graft polymers obtained from polybutadiene and a mixture of acrylonitrile and an aromatic vinyl hydrocarbon (cf. for example DAS No. 1,170,141). Apart from improving the melt index, this has an adverse effect upon other properties such as, for example, tensile strength, elongation and resistance to light and weather. Even small amounts of butadiene-containing polymers are sufficient to cause marked changes in colour under the effect of intense light and/or heat, i.e. increase light and heat sensibility.

It is also known to add rubber-like polymers with aliphatic unsaturated groups in quantities of up to 10 % by weight to thermoplastic polycarbonate moulding compositions (cf. DOS No. 1,930,262). These additives, for example natural rubber, polybutadiene, polyisoprene or butyl rubber, improve the so called "critical thickness" of mouldings in which they are present. "Critical thickness" will be discussed in more detail hereinafter. Since the aforementioned additives have only a very limited compatibility with polycarbonate, there can only be added small quantities so that the improvement in "critical thickness" is also fairly limited. On the other hand the additives in question have an adverse effect upon resistance to heat and light.

Polyethylene and polypropylene have also been added to bisphenol-polycarbonates. This also improves "critical thickness" to some extent. Unfortunately, mixtures of this kind are suitable for injection-moulding only at a polyethylene or polypropylene content of up to about 5 %. Accordingly, the improvements are again limited, considering also that the notched impact strength decreases rapidly with increasing olefin content.

The present invention relates to thermoplastic moulding compositions and mouldings comprising:
a. from 95 to 5 % by weight of polycarbonate of dihydric phenols; and
b. from 5 to 95 % by weight of a graft copolymer of styrene and acrylonitrile on an acrylic acid ester homopolymer and/or copolymer.

In addition, pigments, dyes, fillers, glass fibres or other additives, such as stabilisers and lubricants, may optionally be present in the thermoplastic moulding compositions and mouldings according to the invention.

Unlike the additives referred to above, the graft polymers used in accordance with the invention which contain acrylic acid ester homopolymers or copolymers as graft base, show an unlimited compatibility with polycarbonate. Accordingly, compounds of this type can be added to the polycarbonate in any desired proportion. The graft polymers in question are non-ageing polyacrylate/styrene/acrylonitrile polymers, which are known as ASA-graft polymers and have an elastic polyacrylate, for example a polybutylacrylate copolymer as the grafting base. The polyacrylates are preferably homopolymers of $C_4$ to $C_{12}$ alkyl esters of acrylic acid, for example acrylic acid butyl ester or acrylic acid nonyl ester or copolymers of these esters with acrylonitrile, styrene, vinyl alkyl ethers, methacrylamide methylol ethers or butadiene. Optionally small amounts of cross-linking agents such as divinylbenzene, ethylene glycol dimethacrylate or diacrylate can also be copolymerised as an additional monomer.

Accordingly, graft copolymer (b) comprises from 10 to 90 parts of weight of acrylic acid alkyl ester homopolymer or copolymer and from 90 to 10 parts by weight of styrene/acrylonitrile copolymer which is at least partly chemically linked ("grafted on") to the acrylic acid ester homopolymer or copolymer. Grafting is obtained by polymerising a styrene acrylacrylonitrile mixture in the presence of the acrylic acid ester homopolymer or copolymer. In general, only part of the styrene and acrylonitrile is actually grafted on. This part is expressed by the "degree of graft" of the polymer, i.e. by the weight ratio of grafted styrene/acrylonitrile copolymer to acrylic acid homopolymer or copolymer. The preferred "degree of graft" is from 0.05 to 0.8. The non-grafted styrene and acrylonitrile forms a styrene/acrylonitrile copolymer which is present as such.

The weight ratio of styrene to acrylonitrile in the grafted and non-grafted copolymer is preferably 9 : 1 to 4 : 6. The molecular weights (weight averages) of the styrene/acrylonitrile copolymer are preferably in the range of from 60,000 to 300,000.

The graft copolymers can be obtained in a conventional manner by the radical polymerisation of styrene and acrylonitrile in the presence of the acrylic acid ester polymer in bulk, emulsion, suspension or solution, and by combined processes such as bulk/suspension polymerisation or solution/precipitation polymerisation.

High molecular weight thermoplastic polycarbonates of dihydric phenols (a) include the conventional polycarbonates which are produced by reacting dihydric phenols such as resorcinol, hydroquinone or dihydroxy diphenylene; in particular bis-(hydroxyphenyl)-alkanes, for example, bis-(4-hydroxyphenyl)-2,2-propane (bisphenol A) or bis-(4-hydroxy-3,5-dimethylphenyl)-2,2-propane; trinuclear bisphenols such as α,α'-bis-(4-hydroxyphenyl)-p-diisopropylbenzene; halogenated bis-(hydroxyphenyl)-alkanes, for example 4,4'-dihydroxy-3,5,3', 5'-tetrachlorodiphenyl-2,2-propane or 4,4'-dihydroxy-3,5,3',5'-tetrabromodiphenyl-2,2-propane, bis-(hydroxyphenyl)-cyclo-alkanes, -sulphones, -sulphoxides, -ethers or -sulphides, optionally in admixture with glycols; with derivatives of carbonic acid, for example its diesters or dihalides, and optionally in conjunction with lesser quantities of dicarboxylic acids or derivatives thereof suitable for ester formation. Such polycarbonates have an average molecular weight of at least about 10,000 and preferably of from about 25,000 to about 200,000. This corresponds to a relative viscosity range of from 1.1 to 1.5, as measured in a 0.5 % by weight solution in methylene chloride at 25°C.

In a preferred embodiment a mixture of two polycarbonates is used. This mixture contains 50 – 85 % by weight of a polycarbonate made from a halogen free polyphenol and 15 – 50 % by weight of a halogen containing polycarbonate of the formula

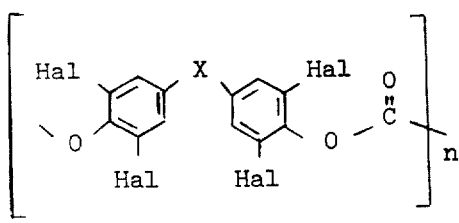

wherein
$n = 15$ to $200$
X = alkylene or alkylidene having 1 to 5 carbon atoms; cycloalkylene or cycloalkylidene having 5 – 15 carbon atoms; a single bond; — O — or

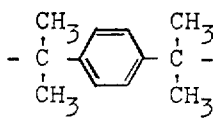

Hal = chlorine or bromine. Preferably the final mixture contains 10 to 30 % by weight of the halogen containing polycarbonate.

As shown by the formula, such halogen containing polycarbonates are based on phenols containing at least two benzene nuclei and carrying 4 halogen (chlorine, bromine) atoms. The molecular weights of such polycarbonates are preferably from 16,000 to 35,000.

When the polycarbonate mixtures are used the thermal stability and moduli of elasticity found in the products are exceptionally high.

The moulding compositions and mouldings according to the invention, have a thermoplasticity different from pure polycarbonate which is reflected in a lower injection moulding temperature and better flow properties.

Their notched impact strength at low temperature is much better when compared to pure acrylic acid ester/styrene/acrylonitrile polymer.

Most importantly notched impact strength is improved considerably as compared to pure polycarbonate:

Mouldings of conventional polycarbonates have a remarkably high notched impact strength up to a critical thickness. If this thickness is exceeded, the notched-impact strength drops sharply to about 1/5 of the original value. The "ductile" break of a thin wall changes into a "brittle" break at the critical wall thickness. The critical thickness is further reduced by the presence of pigments and by prolonged exposure to elevated temperatures; cf. Table 1.

Table 1

| Titanium dioxide content in % | Critical thickness in mm |
|---|---|
| 0 | 5.2 |
| 1 | 3.7 |
| 2 | 2.7 |
| 0 100 h tempering at 100°C | approx. 3.0 |

Further details of this phenomenon can be found in "Polycarbonates," by Christopher and Fox, Reinholds Plastics Application Series, pages 50 to 51. ASA polymers also show this phenomenon, but to a lower extent. Surprisingly the mixtures of this invention have no critical thickness.

In addition to their improved notched impact strength, the mixtures of polycarbonate and ASA-product according to the invention are superior by far to the conventional mixtures mentioned above in their resistance to ageing, heat and light. The thermoplastic moulding compositions according to the invention can be readily processed into moulded articles, for examples rods, tubes, panels, films or sheets, by injection moulding or by vacuum forming.

EXAMPLE I

A polycarbonate prepared from bisphenol A and phosgene having a relative viscosity of 1.28 (determined on a 0.5 % by weight solution in methylene chloride at 25°C) is mixed in various ratios by weight (from 10 : 90 to 90 : 10) with a graft copolymer of 70 % by weight of a styrene/acrylonitrile mixture (ratio by weight 75 : 25) onto 30 % by weight of a copolymer of 63 % by weight of butylacrylate, 26 % by weight of vinylmethyl ether, 10 % by weight of acrylonitrile and 1 % by weight of butane-diol dimethacrylate, with a degree of grafting of 0.4.

The mixtures are prepared by homogeneously mixing granulates of the components, melting the mixture in a single-shaft extruder at 220° to 250°C, extruding the melt into a rope and chopping the rope into a granulate. From mixtures thus prepared test bars are injection-moulded at 230°C.

The notched impact strength of the mixtures is measured in accordance with Izod ASTM D 256, and is found to decrease steadily with an increasing ASA-content. The results are shown in FIG. 1. The ordinate indicates the notched impact strength $a_K$ (according to Izod ASTM 256) and the abscissa the mixing ratio of polycarbonate (PC) to styrene/acrylonitrile/acrylic acid ester graft polymer (ASA) in percent by weight.

Figure 2:
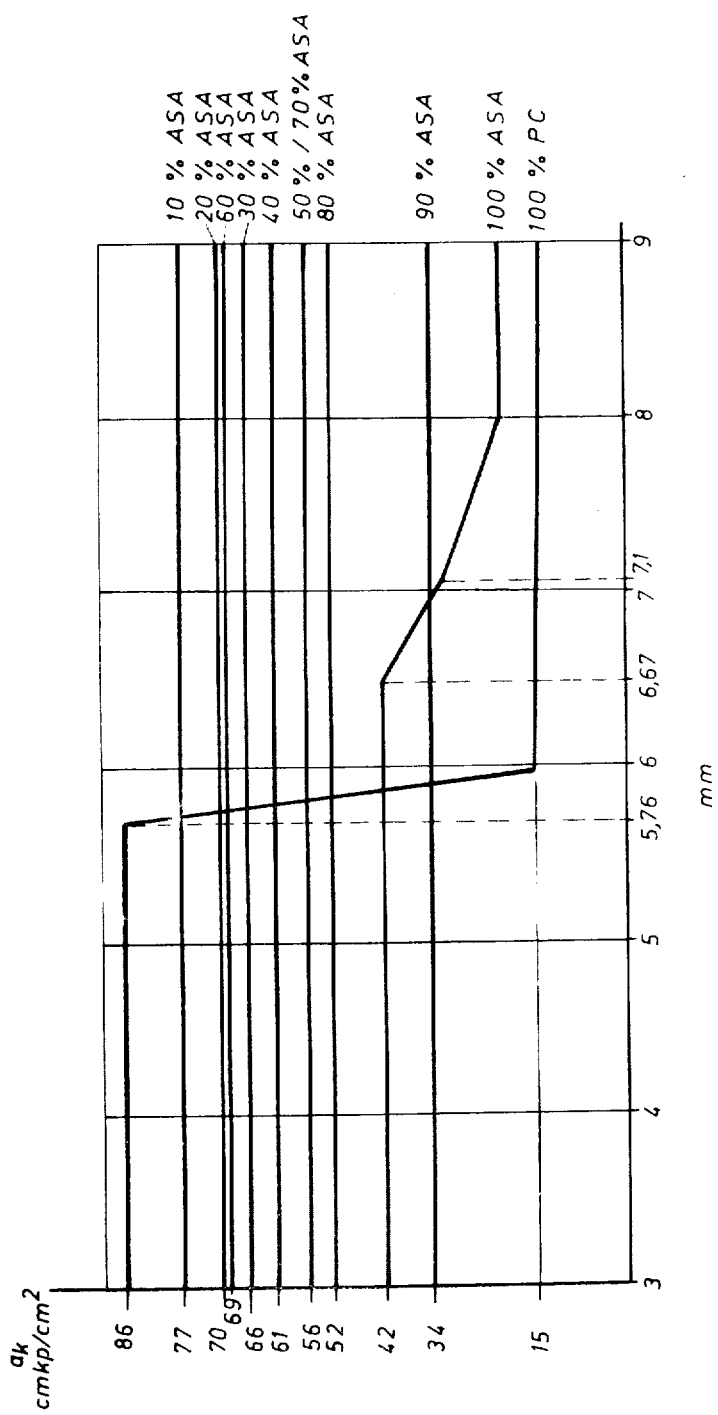

The critical thickness determined by the same method, is found to be 5.76 mm for the pure polycarbonate. All mixtures of polycarbonate and ASA-product (from 90 : 10 to 10 : 90 parts by weight) tested have no critical thickness up to 9 mm (no measurements were made above 9 mm). The critical thickness of the ASA-graft amounts to 6.6 mm. Mixed breaks, i.e. partly brittle to partly tough breaks, are observed from 6.6 to 7.1 mm; brittle breaks only are observed above 7.1 mm. The results are shown in FIG. 2. The ordinate indicates the notched impact strength (as defined in FIG. 1), whilst the abscissa indicates the specimen thickness in mm. For the upper 8 curves, the styrene/acrylonitrile/acrylic acid ester graft copolymer content (ASA) of the moulding composition is given in percent by weight on the right hand side. The remainder is polycarbonate (PC). The two lowermost curves relate to pure (ASA) and pure (PC).

Figure 3:
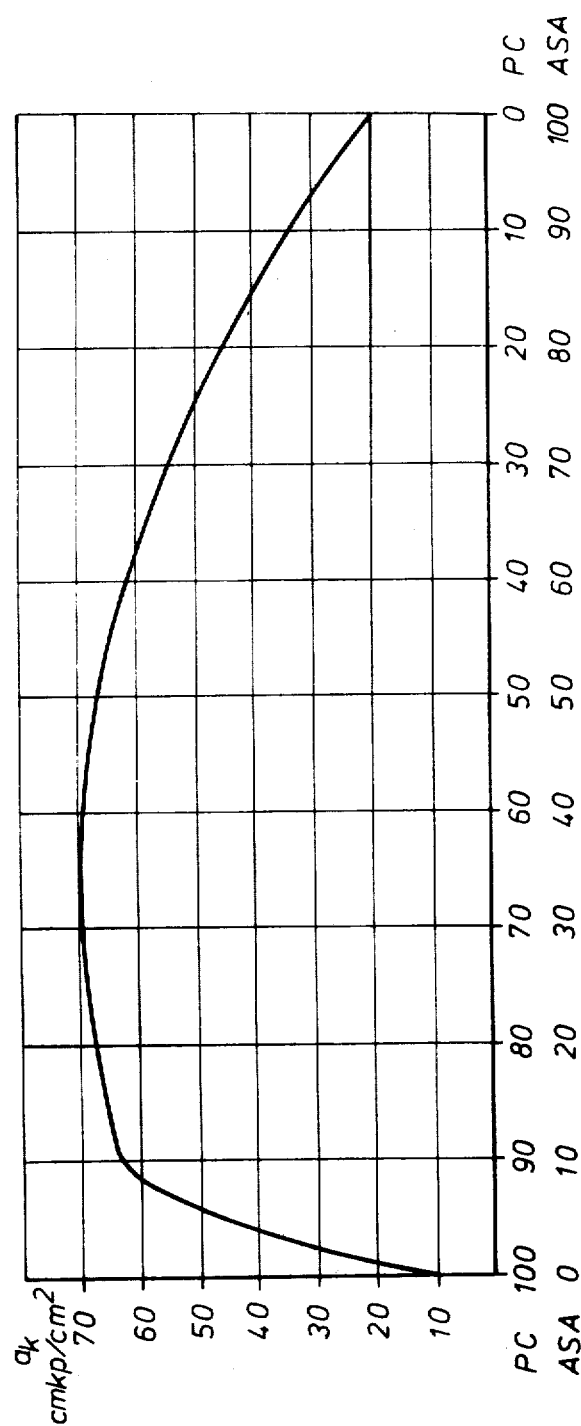

After tempering the test bars for 100 hours at 100°C the notched impact strengths indicated in FIG. 3 are found. The pretreated pure polycarbonate has a critical thickness of 3.6 mm and the ASA-product a critical thickness of 3.3 mm. By contrast, the mixtures prepared do not show any critical thickness, even after tempering.

The test clearly illustrates that, very surprisingly, two thermoplasts, which, individually, have a precisely measurable critical thickness in regard to notched impact strength, no longer have a critical thickness when in admixture with one another. In addition, the test shows that, even after tempering, the mixing ratios of polycarbonate to ASA of from 90 : 10 to 10 : 90 are preferred so far as the highest possible notched impact strength is concerned. The results are set out in FIG. 3. It has the same co-ordinates as FIG. 1. FIG. 3 shows the notched impact strength of the polycarbonate (PC), of the graft copolymer (ASA) and of their mixtures after tempering for 100 hours at 100°C.

EXAMPLE 2

Mixtures of polycarbonate and ASA-product in a ratio of from 90 : 10 to 10 : 90 are prepared in the same was as in Example 1, but with a graft copolymer comprising:

80 % by weight of a styrene/acrylonitrile mixture (ratio by weight 75 : 25):

20 % by weight of a copolymer of 96 % by weight of butylacrylate; and

4 % by weight of methacrylic acid amide -N- methylol methyl ether, with a degree of grafting of 0.53.

Testing the dependence of notched impact strength upon specimen thickness shows that, in contrast to the individual components, these mixtures, too, no longer have a critical thickness in the range investigated.

Figure 4:
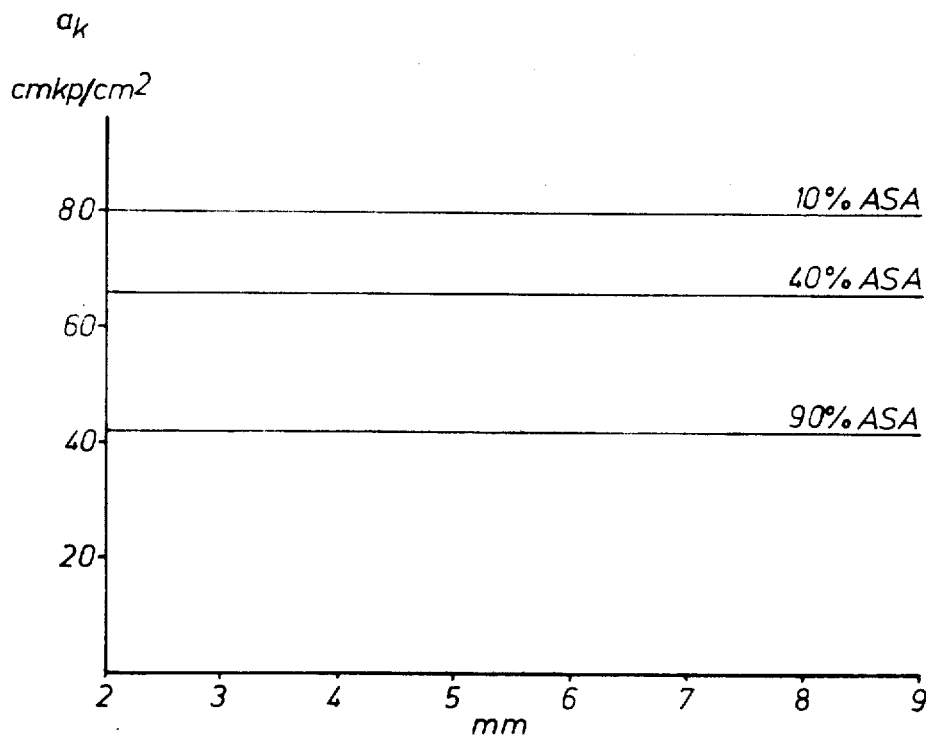

The results are shown in FIG. 4. The co-ordinates are the same as in FIG. 2. The graft copolymer content of the mixtures is given as percent by weight on the right hand side.

EXAMPLE 3:

1. Halogen free homopolycarbonates and halogen containing polycarbonates

Viscosities determined in methylenechloride at 25°C at a concentration of 5 g/l ($\eta_{rel}$): $M_w$ = molecular weight (weight average)

2. Halogen polycarbonates

D) High molecular tetrabromobisphenol-A-polycarbonate  
$\eta_{rel}$ = 1.08  
$M_w$ = ca. 16.000

E) High molecular tetrabromobisphenol-A-polycarbonate  
$\eta_{rel}$ = 1.14  
$M_w$ = ca. 35.000

F) High molecular tetrachlorobisphenol-A-polycarbonate  
$\eta_{rel}$ = 1.12  
$M_w$ = ca. 23.000

3. Acrylate polymers

G. Mixture of 1. 40 parts by weight of an emulsion graft polymer made by grafting 35 parts by weight styrene and 15 parts by weight acrylonitrile onto 50 parts by weight of a copolymer of 96 parts by weight butylacrylate and 4 parts by weight methacrylamide-N-methylolmethyl ether and 2. 60 parts by weight of a copolymer of 70 parts by weight styrene and 30 parts by weight acrylonitrile having an intrinsic viscosity of $[\eta]$ = 80.1 (in dimethylformamide at 20°C);

H. Mixture of 1. 30 parts by weight of an emulsion graft polymer made by grafting 40 parts by weight styrene and 20 parts by weight acrylonitrile onto 40 parts by weight of a copolymer of 80 parts by weight butylacrylate and 20 parts by weight butadiene and 2. 70 parts by weight of a styrene/acrylonitrile-copolymer in a ratio of 70 : 30 having an intrinsic viscosity of $[\eta]$ = 79.0 (in dimethylformamide at 20°C).

The following table contains mixtures and their physical data. The mixtures were made by mixing the compounds in a two shaft extruder.

A) Bisphenol-A-polycarbonate  
$\eta_{rel}$ = 1.30  
$M_w$ = ca. 31.000

B) Copolycarbonate of 80 mol-% bisphenol A and 20 Mol-% tetrabromobisphenol A  
$\eta_{rel}$ = 1.25  
$M_w$ = ca. 30.500

C) Copolycarbonate of 84 mol-% bisphenol A and 16 mol-% tetrachlorobisphenol A  
$\eta_{rel}$ = 1.27

Table

| Example | 1 | 2 | 3 | 4 | 5 | 6 | 7 | 8 |
|---|---|---|---|---|---|---|---|---|
| polycarbonate A) | 50 | — | — | 25 | 40 | 45 | 20 | 20 |
| polycarbonate B) | — | 50 | — | — | — | — | 20 | — |
| polycarbonate C) | — | — | 50 | — | — | — | — | — |
| polycarbonate D) | — | — | — | 25 | — | — | — | — |
| polycarbonate E) | — | — | — | — | 40 | — | 20 | 10 |
| polycarbonate F) | — | — | — | — | — | 15 | — | — |
| mixture G) | 50 | 50 | 50 | 50 | — | — | 40 | — |
| mixture H) | — | — | — | — | 20 | 40 | — | 70 |
| modulus of elasticity kp/cm² DIN 53 455 | 19.400 | 19.900 | 18.700 | 24.900 | 26.100 | 25.700 | 26.400 | 21.300 |
| Vicat B °C DIN 53 460 | 108 | 107 | 106 | 129 | 134 | 127 | 134 | 113 |
| notched impact strength cmkp/cm² | 30 | 33 | 28 | 27 | 26 | 31 | 30 | 28 |

We claim:
1. A thermoplastic moulding composition comprising: a. from 95 to 5 % by weight of a dihydric phenol polycarbonate; and b. from 5 to 95 % by weight of a graft styrene and acrylonitrile copolymer on an acrylic acid ester homopolymer and/or copolymer.
2. A thermoplastic moulding composition as claimed in claim 1, in which the polycarbonate component has a molecular weight of from 25,000 to 200,000.
3. A thermoplastic moulding composition as claimed in claim 1, in which styrene/acrylonitrile graft copolymer component has a molecular weight of from 60,000 to 300,000.
4. A thermoplastic moulding composition as claimed in claim 1, in which the ester component of the acrylic acid ester polymer has from 4 to 12 carbon atoms.
5. A thermoplastic moulding composition as claimed in claim 1, in which the graft copolymer comprises from 10 to 90 parts by weight of acrylic acid ester homopolymer or copolymer and from 90 to 10 parts by weight of styrene/acrylonitrile copolymer.
6. A thermoplastic moulding composition as claimed in claim 1, in which the ratio by weight of grafted styrene/acrylonitrile copolymer to acrylic acid homopolymer or copolymer is from 0.05 to 0.8.
7. A thermoplastic moulding composition as claimed in claim 1, in which the ratio by weight of styrene to acrylonitrile is from 9 : 1 to 4 : 6.
8. A thermoplastic moulding composition as claimed in claim 1, wherein the polycarbonate is a mixture of 50 to 85 % by weight of a polycarbonate made from a halogen free phenol and 15 to 50 % by weight of a halogen containing polycarbonate of the formula

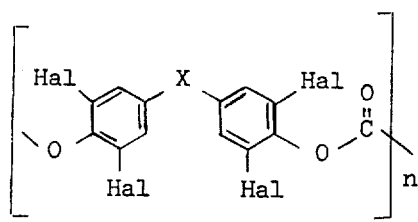

wherein
n is 15 to 200
X is alkylene or alkylidene having 1 – 5 carbon atoms, cycloalkylene or cycloalkylidene having 5 – 15 carbon atoms; a single bond; — O —; or

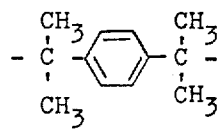

Hal is chlorine or bromine.

* * * * *